United States Patent Office 3,208,159
Patented Sept. 28, 1965

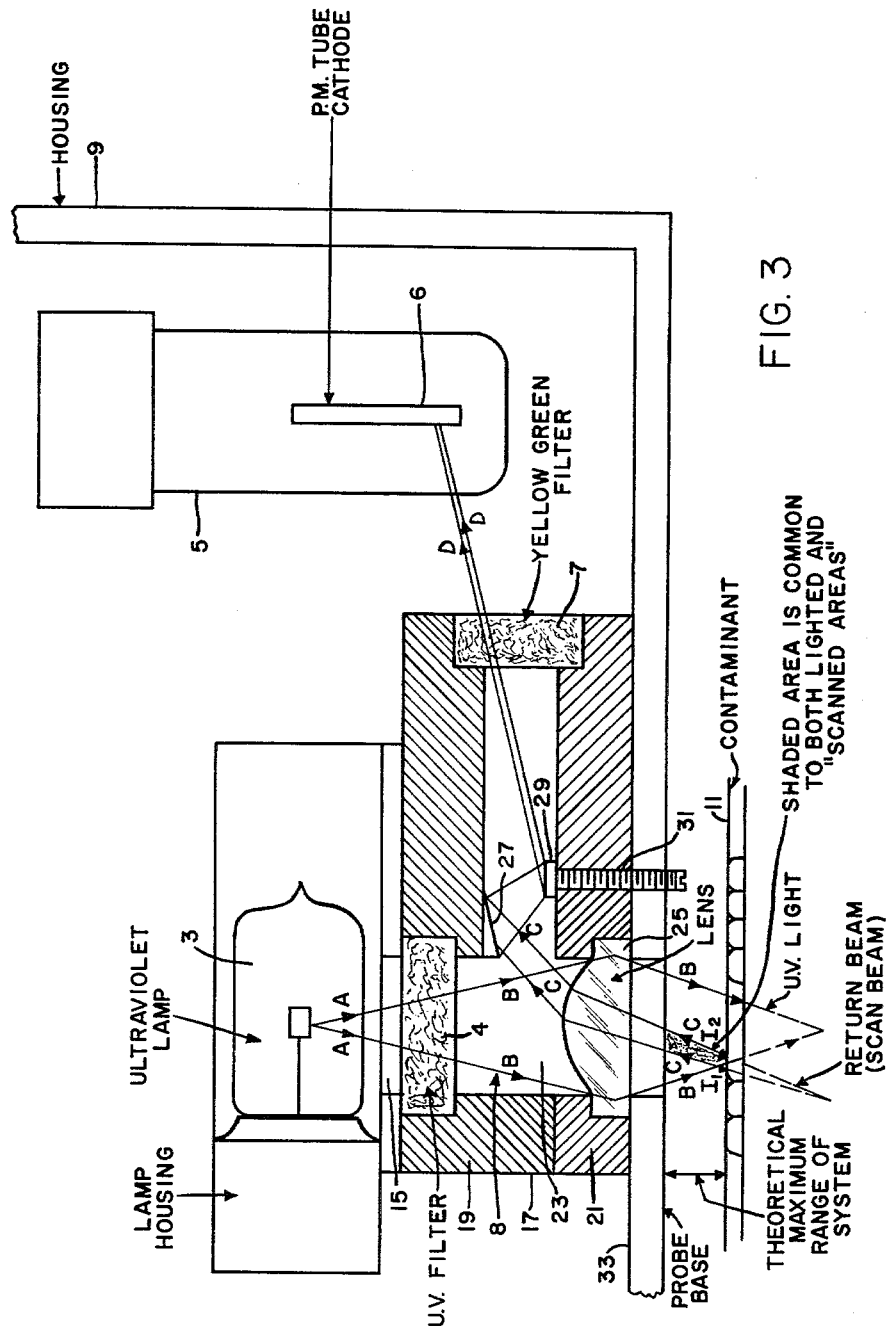

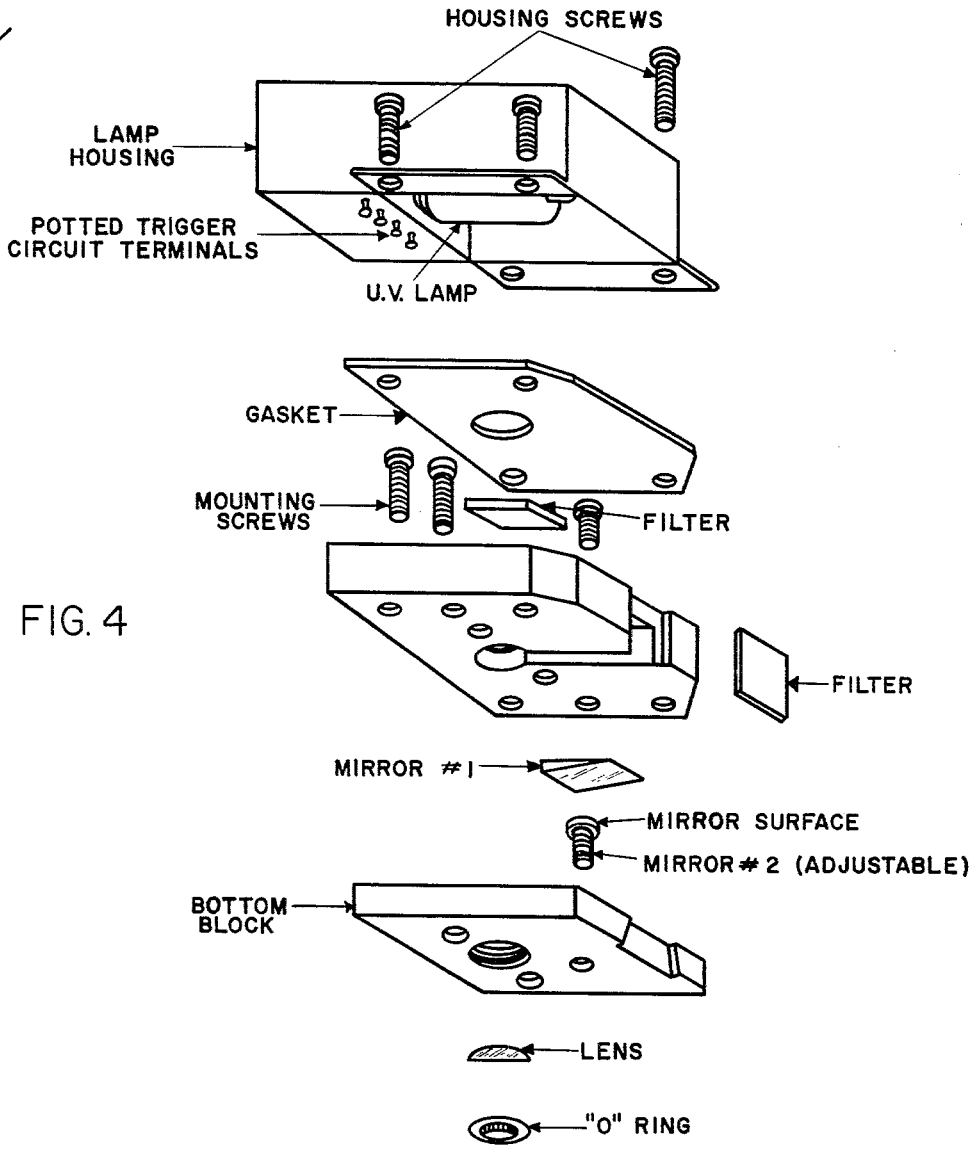

3,208,159
SIMULATED RADIATION DETECTOR
Alexander M. Filipov, Concord, Mass., assignor, by mesne assignments, to the United States of America as represented by the Secretary of the Navy
Filed Aug. 26, 1963, Ser. No. 304,704
5 Claims. (Cl. 35—1)

This invention relates to a simulated radioactive radiation meter, and more particular to an improved optical system means used therewith.

For purposes of training individuals in the detection of radioactive materials it is desirable to simulate actual radioactive conditions as closely as possible and in particular to simulate the actual mode of operation of conventional radioactive radiation meters during detection operations, without endangering the operator.

This has been accomplished in the prior art by utilizing substances which are capable of emitting secondary radiation having a different wave length than incident primary radiation directed thereon. Fluorescence and phosphorescence materials are examples of such substances.

More information describing this effect can be found in O. W. Esbach's Handbook of Engineering Fundamentals, second edition, pages 10 to 22. Prior to a training operation these substances would be applied to various objects in a pattern similar to that which would exist if such objects became radioactive by some occurrence as for example by radioactive fall-out from a nuclear explosion.

The prior art devices, which take advantage of this effect, utilize a radiation meter capable of detecting and indicating the resulting secondary radiation, which ordinarily would include a probe unit and a main meter unit electrically connected to one another. Such a radiation meter would be physically identical in outward appearance to conventional radioactive radiation meters, thereby providing more realistic training. The probe unit therefor, would contain a source of primary radiation of a first frequency, which would be positioned so as to direct the primary radiation toward the object coated by the fluorescent or phosphorescent material, referred to as the "contaminant." The resulting secondary radiation would then be detected by a detection means, in the same unit, which is capable of discriminating between the primary radiation and the emergent secondary radiation. Signals induced by the detected secondary radiation would then be coupled to the main meter unit, containing an amplifier and a meter. Such signals would then be amplified and visually indicated by the meter connected to the output of the aforementioned amplifier. The deflection of the meter would be proportional, in some manner, to the intensity of the primary source of radiation, the amount of contaminant, and the distance between the probe unit and the contaminant, among other factors. Patent literature which discusses simulated radioactive detection techniques and devices include United States Patent 2,900,740.

Radioactive material emit alpha particles, which have a very definite range for a given element. Detailed information relating to this subject can be found in H. Semat's "Introduction to Atomic and Nuclear Physics," third edition, particularly pages 312 to 315. Thus it is seen that various radioactive elements have different ranges, or what may be referred to as different "cut-off" characteristics. Because of such properties, when a real radioactive radiation meter is located near an actual radioactive source, the meter will show an abrupt deflection when the probe unit is moved with the range or "cut-off" characteristic of the particular radioactive material. In the prior art devices "cut-off" simulation is not provided.

One of the objects, therefore, of this invention, is to provide a very realistic simulated radioactive radiation meter.

Another object of the invention is to provide a simulated radioactive radiation meter capable of simulating the action resulting from the range limit or "cut-off" characteristics of radioactive elements.

A further object of the invention is to provide an improved simulated radioactive radiation meter.

An additional object of the invention is to provide an improved optical system means for a simulated radioactive radiation meter.

A still further object of the invention is to provide an optical system means for a simulated radioactive radiation meter which is capable of being adjusted so as to realistically simulate the detection of any particular radioactive element.

These and further objects of the present invention are accomplished in the illustrative embodiments by providing an optical system comprising a lens which is used to focus a primary source of radiation, having a first frequency, on a contaminant and refracting the resulting emanating second radiation by the aforementioned lens, toward several reflecting surfaces which are located away from the optical axis of said lens. One of these reflecting surfaces are adapted to be moved toward the other thereby varying the effective range of the optical system. These reflecting surfaces in turn direct the incident refracted secondary radiation toward a detecting means, which is capable of detecting said secondary radiation.

Other objects and many of the attendant advantages of this invention will be readily appreciated as the same becomes better understood by reference to the following detailed description when considered in connection with the accompanying drawings wherein:

FIG. 3 is a simplified sectional view of the probe unit containing the preferred form of the optical system embodying the invention;

FIG. 4 is an exploded detailed view of the optical system illustrated in FIG. 3 and FIG. 5 is a simplified sectional view of a portion of a probe unit containing a modified form of optical system embodying the invention.

Similar numerals refer to similar parts throughout the several views.

Figure 1:
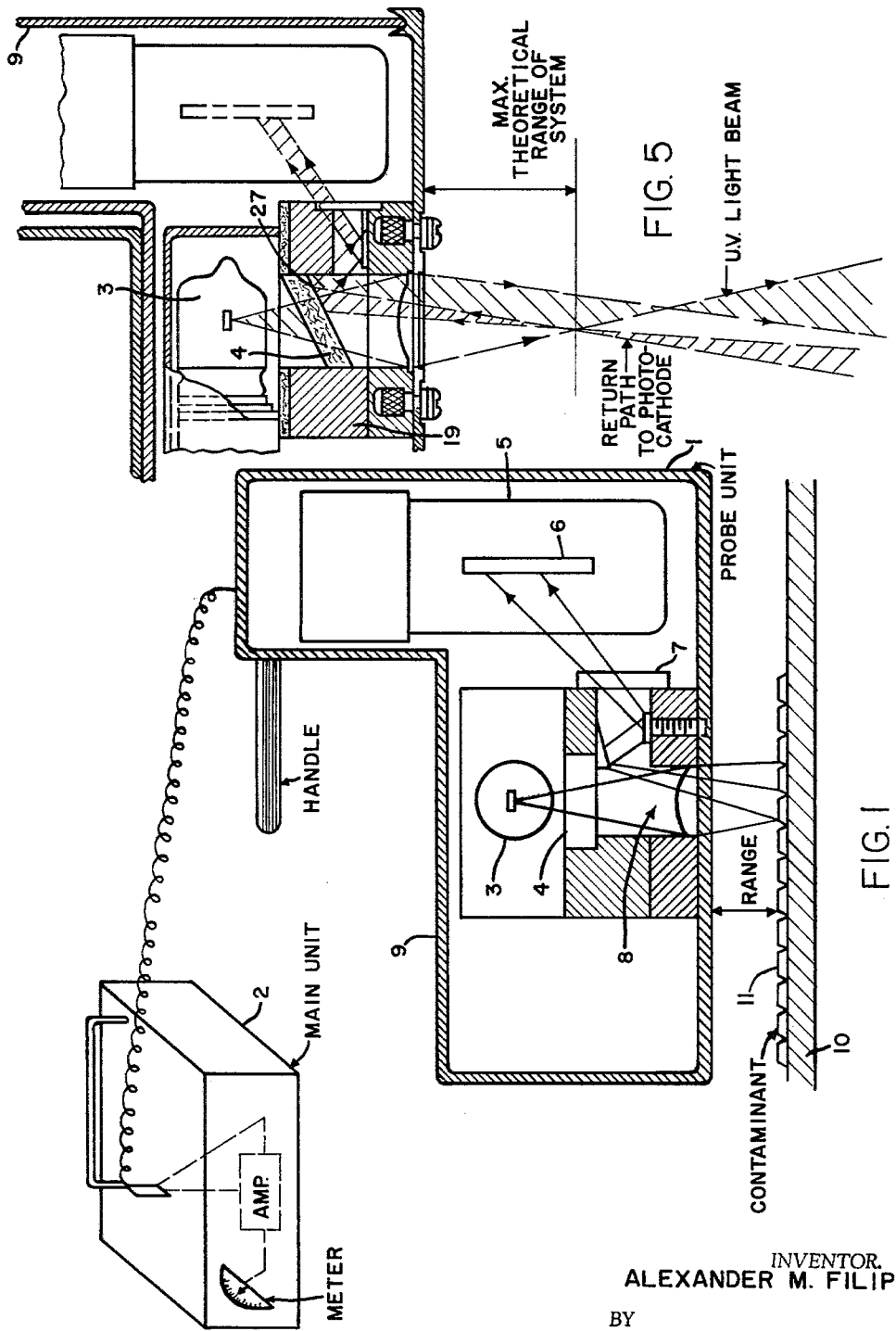
FIG. 1 is a general block diagram, partially in perspective, of the simulated radioactive radiation meter embodying the invention and its operation.

FIG. 1 illustrates generally the invention and its operation. The invention comprises a probe unit 1 and a main unit 2. The probe unit 1 includes: a source of primary radiation of a first frequency, the ultra-violet lamp 3, and the first filter 4; a detection means adapted to receive a second frequency, a photomultiplier tube 5, having a cathode 6, and a second filter 7 and; an optical system means, generally indicated as 8, see infra, is positioned in relation to the source of primary radiation and the detection means so as to vary the effective detection range of the meter. All of such components are contained within the probe housing 9. A surface 10, having a substance applied thereon capable of emitting secondary radiation of a second longer frequency in response to radiation of a first frequency, the contaminant 11, is located near the probe unit 1, during a detection exercise. Any fluorescent or phosphorescent substance could be used, as for example "POPOP," commonly known as the "wavelength shifter." The main unit 2 includes an amplifier, and a meter, coupled to its output. The output of the photomultiplier tube 5, referred to as a "PM" tube, is connected by cable 10, to the input of the amplifier.

Figure 2:
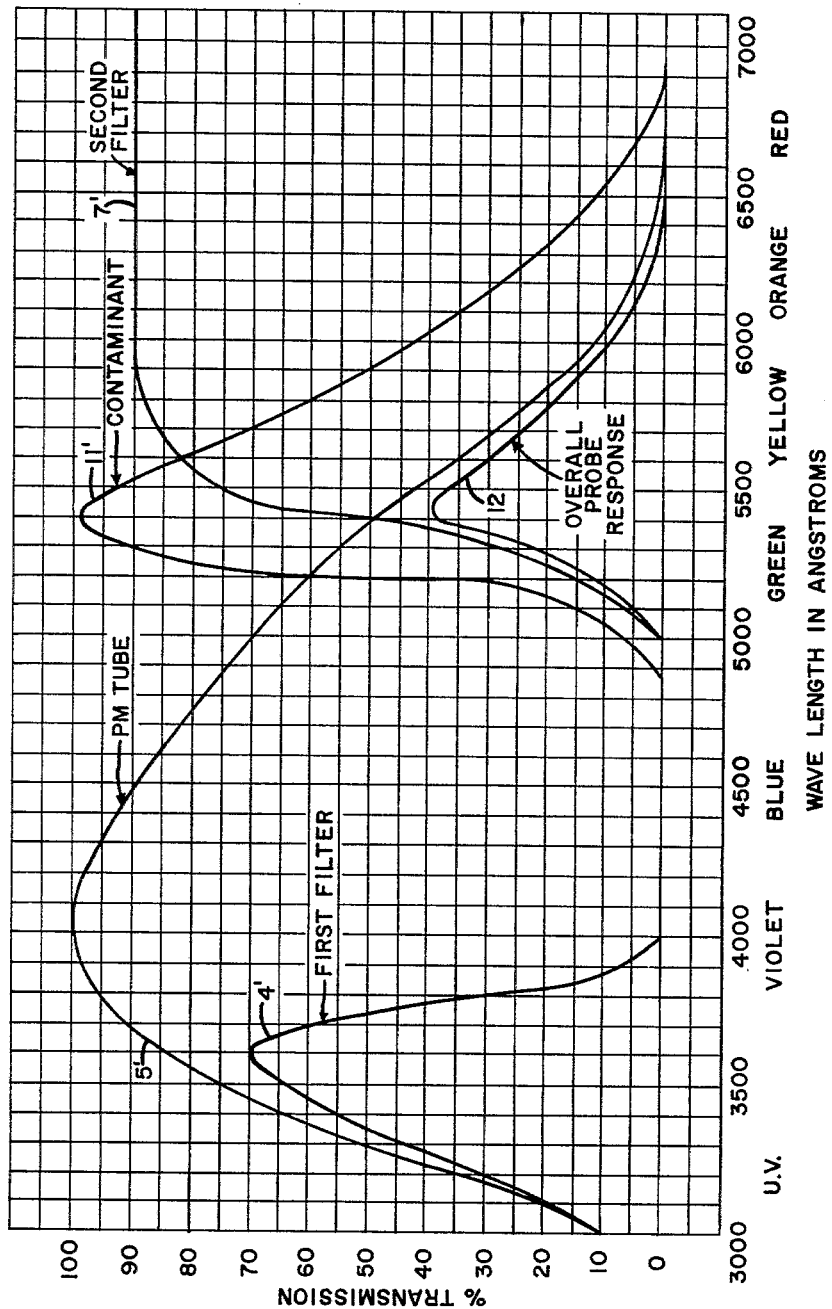
FIG. 2 illustrates the response curves of various components of the simulated radioactive radiation meter in percent transmission against wave length in angstroms.

In operation, referring to FIGS. 1 and 2, light from the ultraviolet lamp 3, passes thru the first filter 4, and is focused at the contaminant 11, on the surface 10. The response of the first filter 4, is illustrated by curve 4'. The first filter 4, therefore passes only ultraviolet light to the surface of the contaminant 11. Secondary radiation of a different frequency emanates from the surface of the contaminant 11, in response to the ultraviolet light impinging thereon.

The response of the particular contaminant 11 was used in the preferred embodiment, yellow phosphor, to the primary radiation or ultraviolet light impinging thereon is illustrated by curve 11'. Only a small portion of this secondary radiation is directed thru the optical system means 8 and detected. A portion of the secondary radiation is directed thru the optical system means 8, by several mirrors and thru the second filter 7 to the cathode 6 of the PM tube 5. The response of this second filter 7 is illustrated by curve 7'. This filter does not pass any ultraviolet, violet nor blue light. Thus only light falling in the green to red part of the spectrum can reach the PM tube 5. The response of the PM tube 5 is illustrated by curve 5'. Thus in effect only yellow light can be detected by the cathode 6 of the PM tube 5 due to the different response of the various elements. Curve 12 illustrates the overall response of the probe unit 1.

Normal room lighting or outdoor lighting has no substantial effect on the operation of the device, but the device is responsive to strong light shining directly into the optical system means 8, and therefore certain surfaces cannot be successfully monitored. These include lighting fixtures which are operating, and sunlighted windows.

Referring specifically to FIGS. 3 and 4, the probe includes: an ultraviolet lamp 3, an outer housing 9, and a gasket 13 having a first aperture 15 in the middle; an optical housing unit, generally indicated as 17, and a PM tube 5 located to one side of the optical housing unit 17.

The optical housing unit 17, includes: an upper block 19; a first ultraviolet filter 4, which is recessed in the upper block 19 and covers the first aperture 15; a bottom block 21 secured to the upper block 19 and having an opening 23 therein located in alignment with said first aperture 15; a coated plano-convex lens 25 disposed in the opening 23; a second "yellow-green" filter 7 recessed in the sides of the blocks; two reflecting mirrors, 27 and 29, the first 27, which is located on the underside of the upper block 19, adjacent its aperture, and parallel to its longitudinal surface, and the second mirror 29, which is located on the top surface of the lower block 21 near the yellow-green filter 7, and parallel to the first reflecting mirror 27; and an adjusting screw 31, connected to the bottom surface of the second reflecting mirror 29. The optical system means 8, as defined, includes elements 25, 27, 29 and 31. FIG. 4 illustrates in detail the actual arrangement, in an exploded view, of the various components making up the optical portion of the probe, 1.

Referring to FIG. 3, alone the light A from the lamp 3 passes through the ultraviolet filter 4 into a lens 25. This resulting incident primary radiation B is pure ultraviolet. This radiation B is in turn focused thru the lens 25 onto a spot of about a quarter of a square inch on the surface of the contaminant 11, referred to as the lighted area, at one to one half of an inch from the base of the probe 1. This lighted area, is bounded by the focused radiation B. A spot of much smaller area is "viewed" or "scanned," referred to as the "scanned area," by the cathode 6, of the PM tube 5, along a beam of light which is directed back through the same lens 25. The "scanned area" is that area which comes within the boundaries of a "return" beam or "scan" beam, which is bounded by the secondary radiation beams C as illustrated. The secondary radiation C within the scan beam which emanates from the contaminant 11, in response to the ultraviolet primary radiation B is refracted by lens 25 at the critical or proper angle toward the first horizontally mounted reflecting mirror 27. This incident secondary radiation C, within the scan beam, is in turn reflected toward the second adjustable reflecting mirror 29, to the cathode 6 of the PM tube 5 through the yellow-green filter 7. It should be observed that secondary radiation will only be detected if there is an area common to the "lighted area" and the "scanned" area. Otherwise stated, the range is limited to the points of intersection $I_1$ and $I_2$ between the return beam or secondary radiation within the scan beam C and the primary incident beam B. The second reflecting mirror 29 is adjustable by screw 21 so that this range may be altered. Thus as the second reflecting mirror 29 is moved upwards, the points of intersection $I_1$ and $I_2$ move closer to the base of the probe 1, thereby shortening the range of the optical system means 8. This common area is shown shaded in the drawing of FIG. 3. Further, if the probe base 33 is located more than an inch from the contaminant 11, there will be no common area, and the maximum range of the optical system means 8 would be exceeded. In this way the optical system means 8 simulates the action of an alpha particle, that is, it simulates the "cut-off" characteristics or range limit that alpha particles exhibit in air. When the probe's base 33 is very close to the surface of the contaminant 11, and parallel thereto, all the secondary radiation C reaches the cathode 6 of the PM tube 5. Of course, only secondary radiation D, that is not filtered out by filter 7, reaches the cathode 6. As the probe 1, is moved away, the secondary radiation intensity diminishes slightly, but at a range of one inch the return secondary radiation C within the scan area, is rapidly cut off.

The embodiment of FIG. 5 is a modification of that of FIGS. 3 and 4 in which the ultraviolet filter 4" is angularly disposed within the aperture of the upper block 19, and the first reflecting mirror 27", is a silvered area located on the underside of the aforementioned ultraviolet filter 4", capable of transmitting the incident primary radiation from the ultraviolet lamp 3.

Various other modifications are possible, such as eliminating the probe unit and enclosing its components within an enlarged main unit.

Thus it is seen that a unique optical system means comprising a focusing and refracting lens and two mirrors, one of which adjustable contained in the simulated radioactive radiation meter simulate realistically the "cut-off" characteristics or range limit that alpha particles exhibit in air.

Obviously many modifications and variations of the present invention are possible in the light of the above teachings. It is therefore to be understood that within the scope of the appended claims the invention may be practiced otherwise than as specifically described.

What is claimed is:

1. In a simulated radioactive radiation meter of the type having a source of primary radiation of first frequency and detection means that are adapted to receive secondary radiation of a second frequency from a substance remotely located which is capable of emitting secondary radiation of a second frequency in response to primary radiation of a first frequency directed thereon, the combination with:

means, positioned in relation to the source of primary radiation and the detection means, for simulating the detection cut-off characteristics of radioactive materials.

2. In a simulated radioactive radiation meter of the type having a source of primary radiation of a first frequency and detection means adapted to receive secondary radiation of a second frequency from a substance remotely located which is capable of emitting secondary radiation of a second frequency in response to primary radiation of a first frequency directed thereon, the combination with:

optical means, positioned in relation to the source of primary radiation and the detection means, for simulating the detection cut-off characteristics of radioactive materials.

3. In a simulated radioactive radiation meter of the type having a source of primary radiation of a first frequency and detection means adapted to receive secondary radiation of a second frequency from a substance remotely located which is capable of emitting secondary radiations of a second frequency in response to primary radiation of a first frequency directed thereon, in combination with:

optical means, positioned in relation to the source of primary radiation and the detection means, for simulating the detection cut-off characteristics of radioactive materials and for varying the simulated detection cut-off characteristic.

4. The device as in claim 2, wherein said optical means includes, radiation reflecting means for reflecting secondary radiation incident thereon toward said detecting means and, means for focusing said source of primary radiation at said substance and refracting a portion of the emergent secondary radiation toward said radiation reflecting means.

5. A meter of the type having a source of primary radiation of the first frequency and detection means adapted to receive secondary radiation of a second frequency from a substance remotely located which is capable of emitting secondary radiation of a secondary frequency in response to primary radiation of a first frequency directed thereon, the combination with:

means, positioned in relation of the source of primary radiation and the detection means, for simulating the detection cut-off characteristics of radioactive materials.

References Cited by the Examiner
UNITED STATES PATENTS 2,900,740    8/59    Brault et al. _____ 35—1

EUGENE R. CAPOZIO, *Primary Examiner.*

LAWRENCE CHARLES, *Examiner.*